United States Patent [19]

Mandish et al.

[11] 4,241,107

[45] Dec. 23, 1980

[54] ROOF COATING PROCESS

[76] Inventors: Theodore O. Mandish; Doneath M. Mandish, both of Rte. 2, Box 184, Titusville, Fla. 32780

[21] Appl. No.: 896,247

[22] Filed: Apr. 14, 1978

[51] Int. Cl.³ .............................................. B32B 35/00
[52] U.S. Cl. .................................... 427/140; 156/71; 156/279; 427/186; 427/187; 427/202; 427/204; 427/214; 427/222; 427/264; 427/355; 427/372.2; 427/403; 427/421
[58] Field of Search ............... 427/140, 186, 187, 202, 427/204, 214, 355, 222, 372 R, 376 A, 277, 403, 264; 428/256, 489, 281, 280, 282, 236; 156/71, 279

[56] References Cited

U.S. PATENT DOCUMENTS

| | | | |
|---|---|---|---|
| 1,826,706 | 10/1931 | Davis | 427/186 |
| 1,972,810 | 9/1934 | Wettlaufer | 427/264 |
| 1,983,495 | 12/1934 | Fischer | 428/489 |
| 2,018,216 | 10/1935 | MacLean | 427/264 |
| 2,274,189 | 2/1942 | Congleton | 428/247 |
| 2,548,029 | 4/1951 | Kurtz et al. | 156/279 |
| 2,798,822 | 7/1957 | Carter | 427/186 |
| 3,940,540 | 2/1976 | Schmidt | 156/71 |
| 4,011,355 | 3/1977 | Mandish et al. | 427/214 |
| 4,090,336 | 5/1978 | Carroll | 428/256 |

*Primary Examiner*—Ronald H. Smith
*Assistant Examiner*—S. L. Childs
*Attorney, Agent, or Firm*—Duckworth, Hobby, Allen & Pettis

[57] ABSTRACT

A unique method for applying a lightweight cementitious coating to either existing or new roof surfaces. The invention relates to the method of preparing the coating mixture and its manner of application.

9 Claims, 1 Drawing Figure

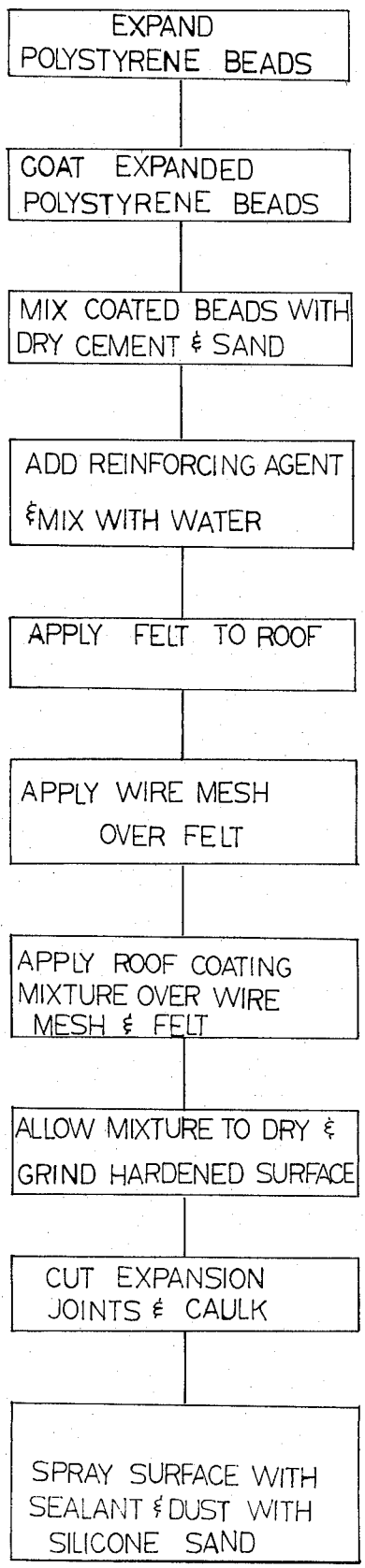

ROOF COATING PROCESS

BACKGROUND OF THE INVENTION

1. Field of the Invention

The present invention relates to a unique method for preparing and applying a lightweight cementitious coating to existing and/or new roof surfaces. By virtue of the method of the present invention, the roof coating provides an extremely durable, light-weight and attractive roof surface.

2. Description of the Prior Art

Today, various kinds of coatings or coverings for roof structures are well known. Of course, perhaps the most common type of roof coating or covering material is asphalt-type shingles. Of course, particularly in warm climates, clay and ceramic tiles are also utilized as roof coatings. Another type of roofing material is generally referred to in the building industry as builtup gravel. This type of roofing construction is prepared by the application of a tar, or asphalt base onto which loose gravel is scattered. Finally, more modern structural building techniques have resulted in the construction and application of roofing materials comprising sheets of metal, fiberglass, plastic, or other such synthetic materials.

As a result of the energy crisis of recent years, it has also become common practice to apply a coating to existing roof structures for the specific purpose of increasing the insulative capabilities of the roof as well as for the purpose of reflecting the sun's rays. Certain problems have been identified with such roof coatings. In the first place, in order to effectively increase the insulative capabilities of the roof, it is often necessary to add such a heavy coating as to create structural complications. That is to say, it may be necessary to add further reinforcement to the roof construction from within before the coating can be applied. Furthermore, since insulating materials are normally of relatively low density, it is often necessary to add yet a second coating on top of the insulating medium. In the case of roof coatings specifically designed for reflecting the sun's rays, the coating often comprises nothing more than a layer of white, or light-colored paint. In this case, the homeowner is then faced with the requirement of having to maintain a relatively large painted surface.

Accordingly, it is clear that there is a great need in the art for a method of coating either existing or new roof structures with a relatively lightweight material such that the roof will be provided with a durable, attractive surface. So that the coating may be utilized in a variety of structural applications, it would be further desirable if it could be applied either manually, as by trowelling or spreading, or by pumping the coating material to the roof sides. Of course, the method for coating the roof must be suitable for use either in new installations or in covering existing roofs.

SUMMARY OF THE INVENTION

The present invention relates to a unique method for coating either existing or new roof constructions wherein the roof coating mixture comprises a cementitious composition utilizing the lightweight aggregate disclosed and claimed in my U.S. Pat. No. 4,011,355. In accord with the method of the present invention, the lighweight aggregate is admixed with cement, sand and a reinforcing agent such as biferglass strands or steel fibers and water to obtain a suitable consistency. The roof coating mixture is then applied either manually or by pumping onto the prepared roof surface.

The roof surface is prepared for application of the coating mixture by first sealing it with felt and tar and applying a reinforcing wire mesh over the felt and tar. The coating mixture is then applied, trowelled, smoothed, and allowed to cure. Once the coating mixture has cured, the surface is ground smooth, and, when appropriate, expansion joints are opened as by cutting. Since the roof coating mixture possesses alkali characteristics, an alkali-resistant resilient material is utilized to fill the expansion joints. Next, a sealant coat is sprayed over the cured, ground roof coating. This sealant may comprise a rubberized coating or a sprayable, hard surfaced cement. Finally, while the sealant is still wet, the coating is dusted with sand having a high silicone content.

Accordingly, the method of the present invention provides a relatively lightweight coating which is not only aesthetically pleasing in appearance, but also is extremely durable.

The invention accordingly comprises the several steps and the relation of one or more of such steps with respect to each of the others thereof which will be exemplified in the method hereinafter disclosed, and the scope of the invention will be indicated in the Claims.

BRIEF DESCRIPTION OF THE DRAWING

For a fuller understanding of the nature and objects of the invention, reference should be had to the following detailed description taken in connection with the accompanying drawing, in which:

The FIGURE present a flow chart for the roof coating method.

DETAILED DESCRIPTION

The present invention relates to a method for preparing and applying a coating mixture to a roof structure. As illustrated in the flow chart of the FIGURE, the method first comprises the expansion of polymer beads, such as polystyrene beads, for use as aggregate in the cementitious roof coating mixture once the beads themselves have been coated in accord with the disclosure of my U.S. Pat. No. 4,011,355. Once the polystyrene beads have been coated as described in that patent, the roof coating mixture is obtained by admixing the coated beads to dry cement and sand in the ratio, by volume, of approximately 7 parts coated beads, 2 parts cement and ¼ part sand. This dry mixture is thoroughly agitated, and while being agitated in its dry state a reinforcing agent such as fiberglass strands or steel fibers is added thereto. This reinforcing agent is preferably added in the ratio of approximately 1%, by weight, with regard to the dry mix. Then, sufficient water is added to obtain a suitable consistency for the completed coating mixture.

Meanwhile, the roof structure is prepared for application of the coating mixture by placement of tar and builders felt thereon. The placement of the tar and felt paper is important for its function as a vapor barrier in order to isolate the roof coating from the new or existing roof substructure. Prior to application of the roof mixture it is further desirable to place wire mesh over the felt paper as reinforcement. Having thus prepared the roof, the wet coating mixture is applied.

Depending upon the nature of the installation being made, the roof coating mixture may be manually applied or it may be pumped onto the roof. Since the roof coating mixture is a cementitious composition, it is next trowelled to obtain a substantially smooth surface. Furthermore, it should be noted that provision for expansion joints normally associated with relatively large pours of cementitious materials may be desirable.

Once the coating mixture has cured, the exposed surface is smoothed by a suitable grinding apparatus. Next, expansion joints, if necessary, are cut and filled with a resilient caulking material. Inasmuch as the roof coating possesses alkali characteristics, the resilient caulking material should be of an alkali-resistant material.

Finally, the exposed surface of the roof coating is sealed by spraying thereonto a seal coating in the following preferred example:

1 part alkaline resistant glass 1/32nd. Strand
1 part sand
1 part alumina powder
2 part cement
14 oz. per 100 lbs. weight of water repellent agent
4 lbs. polymeric base
½ oz. wetting agent
4 lbs. to 100 lbs. high tensile steel, bronze coated
Optional to the steel would be 4 lbs. to 100 lb. mix of 1½ alkaline resistant glass.
Color is optional The dry mixture of sand, glass, alumina, cement, water repellent agent, polymeric and wetting agent is mixed with water to a sprayable consistency. Spray one layer down—if conditions are dry, mist with water before coating. The metal of fiberglass fibers are applied in an even pattern onto the roof area. Then another coating is applied or sprayed onto the fibers, making a finished coating.

In order to enhance the final appearance of the roof it may be desirable to lightly dust the wet sealant material with sand of a high silicone content. If so dusted, the new roof will exhibit a clean white appearance much like that of fresh-fallen snow.

It is, of course, to be understood that the roof coating method described herein is suitable for use over virtually any type roof construction or substrate. Advantageously, the roof covering does not adhere and is not attached to the roof being covered and therefore does not generate thermal stresses between the roof coating and the roof surface being coated. It is furthermore to be understood that the final appearance of the roof coating may be altered as by the addition of colorants thereto without departing from the scope of the invention.

It will thus be seen that the objects set forth above, among those made apparent from the preceding description, are efficiently attained, and since certain changes may be made in carrying out the above method without departing from the scope of the invention, it is intended that all matter contained in the above description shall be interpreted as illustrative and not in a limiting sense.

It is also to be understood that the following Claims are intended to cover all of the generic and specific features of the invention herein described, and all statements of the scope of the invention which, as a matter of language, might be said to fall therebetween.

We claim:

1. A method for coating a roof, said method consisting essentially of the steps of:
    preparing the surface of the roof to be coated by applying felt and tar thereto;
    placing wire mesh over said felt and tar;
    applying a roof coating mixture formed by coating expanded polymer beads with a composition consisting essentially of equal parts, by volume, dehydrated lime and hydrated alumina in combination with water having a wetting agent therein, admixing said coated beads to dry cement and sand in the ratio, by volume, of approximately 7 parts said coated beads, 2 parts said cement and ¼ part said sand, and adding thereto approximately 1%, by weight, reinforcing agent and sufficient water to obtain said roof coating mixture of a workable consistency to said prepared roof;
    curing said roof coating mixture;
    grinding the surface of said cured mixture; and spraying the coated roof with a sealant.

2. A method for coating a roof as in claim 1 further comprising applying a roof coating mixture including approximately 1%, by weight, reinforcing agent selected from the group consisting of fiberglass strands and steel fibers.

3. A method for coating a roof as in claim 1 further comprising the steps of cutting expansion joints into said ground, cured mixture and filling said expansion joints with a resilient caulking material prior to the step of spraying with said sealant.

4. A method for coating a roof as in claim 1 comprising spraying said coated roof with a hard surface cement.

5. A method for coating a roof as in claim 1 comprising spraying said coated roof with a rubberized sealant.

6. A method for coating a roof as in claim 1 further comprising applying said roof coating mixture manually by trowelling.

7. A method for coating a roof as in claim 1 further comprising applying said roof coating mixture by pumping.

8. A method for coating a roof as in claim 1 further comprising dusting the wet sealant with sand.

9. A method for coating a roof, said method consisting essentially of the steps of:
    expanding lightweight polymer beads;
    removing the moisture from said expanded beads;
    coating said dried beads by mixing with a mixture formed of approximately equal parts, by volume, of dehydrated lime and hydrated alumina in combination with water having a wetting agent therein to form a suitable consistency;
    adding said coated beads to dry cement and sand in the ratio, by volume, of approximately 7 parts said coated beads, 2 parts said cement, and ¼ part said sand;
    adding approximately 1%, by weight, reinforcing agent selected from the group consisting of fiberglass and steel fibers to the dry mixture of said coated beads, said cement and said sand;
    introducing sufficient water to the mixture of the above step to obtain a coating mixture of a workable consistency;
    preparing the surface of the roof to be coated by applying felt and tar thereto;
    placing wire mesh over said felt and tar;
    applying said coating mixture to said roof;
    curing said coating mixture;
    grinding said cured coating mixture;
    cutting expansion joints into the coated roof;
    filling said expansion joints with a resilient caulking material;
    spraying said coated roof with a sealant selected from the group consisting of a hard surface cement and a rubberized sealant; and
    dusting the wet sealant with sand.

* * * * *